United States Patent [19]

Viehmann

[11] Patent Number: 4,688,831
[45] Date of Patent: Aug. 25, 1987

[54] THREADED OR PUSH-TYPE COUPLING

[75] Inventor: Werner Viehmann, Darmstadt, Fed. Rep. of Germany

[73] Assignee: Preussag Aktiengesellschaft, Hannover, Fed. Rep. of Germany

[21] Appl. No.: 736,053

[22] Filed: May 20, 1985

[30] Foreign Application Priority Data

May 21, 1984 [DE] Fed. Rep. of Germany ....... 3418892

[51] Int. Cl.$^4$ ............................................. F16L 39/00
[52] U.S. Cl. ................................... 285/137.1; 285/370
[58] Field of Search .................... 285/370, 397, 137.1, 285/133.1, 137.2, 133.2, 371

[56] References Cited

U.S. PATENT DOCUMENTS

| 1,547,461 | 7/1925 | Steele ........................... 285/133.1 X |
| 1,862,260 | 7/1932 | Edmunds . |
| 2,054,859 | 9/1936 | Kitching ....................... 285/133.1 X |
| 2,178,931 | 11/1939 | Crites et al. . |
| 3,032,116 | 5/1962 | Barry .............................. 285/370 X |
| 3,077,358 | 2/1963 | Costa . |
| 3,182,598 | 5/1965 | McArthur et al. . |
| 3,216,751 | 11/1965 | Der Mott ....................... 285/370 X |
| 3,380,760 | 4/1968 | McArthur et al. . |
| 3,638,970 | 2/1972 | Sandquist et al. ............ 285/133.1 X |
| 3,648,311 | 3/1972 | Voss ................................ 285/134 X |
| 4,121,858 | 10/1978 | Schulz ............................. 285/41 X |
| 4,521,039 | 6/1985 | Schulz .......................... 285/133.1 X |
| 4,550,936 | 11/1985 | Haeber et al. ................. 285/370 X |

FOREIGN PATENT DOCUMENTS

| 224404 | 4/1961 | Austria . |
| 1267184 | 7/1961 | Fed. Rep. of Germany . |
| 1229934 | 12/1966 | Fed. Rep. of Germany . |
| 1234163 | 2/1967 | Fed. Rep. of Germany . |
| 1947230 | 4/1971 | Fed. Rep. of Germany ... 285/133.1 |
| 2629116 | 1/1978 | Fed. Rep. of Germany . |
| 3301806 | 9/1983 | Fed. Rep. of Germany . |
| 3316709 | 11/1983 | Fed. Rep. of Germany . |
| 3240226 | 5/1984 | Fed. Rep. of Germany . |
| 878939 | 2/1943 | France .............................. 285/137.1 |
| 1593911 | 7/1970 | France . |
| 119283 | 4/1976 | German Democratic Rep. . |
| 273329 | 5/1951 | Switzerland . |

Primary Examiner—Thomas F. Callaghan
Attorney, Agent, or Firm—Armstrong, Nikaido, Marmelstein & Kubovcik

[57] ABSTRACT

A coupling for hoses, pipe and tubing which allows the simultaneous and independent flow of two or more materials through the coupling having of a male coupling portion with two or more circumferential channels terminating in a coupling and having circumferential steps between each channel, a female portion having a like number of circumferential channels terminating in a stepped coupling portion and a by-pass ring having one fewer channels than the male and female portions and insertable between the male and female portions to separate the flow of material.

3 Claims, 1 Drawing Figure

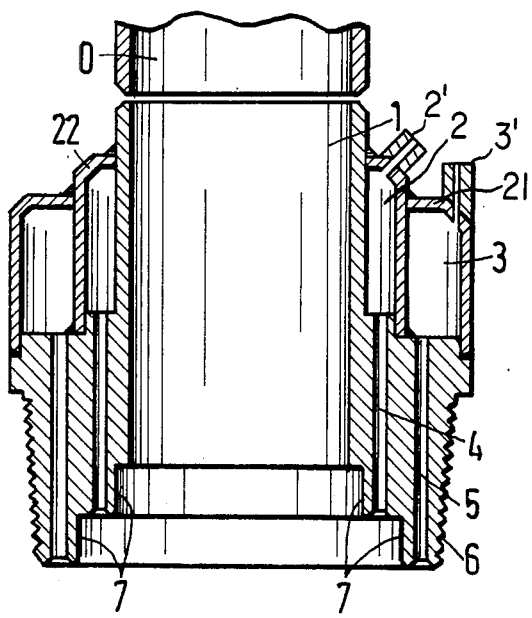
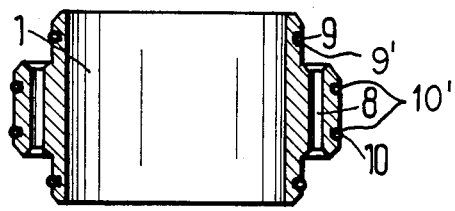
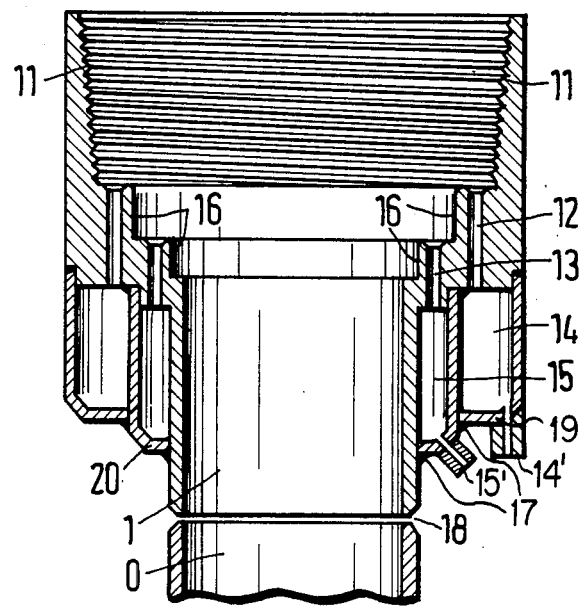

THREADED OR PUSH-TYPE COUPLING

BACKGROUND OF THE INVENTION

Numerous applications exist where it is necessary or desirable to pump two or more incompatible materials to a common destination through a restricted circular opening or where it is necessary to provide a supply and a return through such an opening. The most obvious examples occur in deep well drilling and examples in air conditioning systems, hot and cold water delivery systems and in hydraulic control systems are readily apparent. Couplings for such coaxial piping systems must provide a tight seal for separation of fluids and must be easily and quickly broken and resealed. Preferably, there should be a minimal pressure drop across the coupling when compared to straight pipe.

BRIEF SUMMARY OF THE INVENTION

The invention is a multi-channel coupling which may be either of the threaded or push-type. The coupling consists of three components; a male portion, a by pass ring, and a female portion. The by-pass ring is a circular connector having at least one open channel and carrying on the surface of its exterior, O-rings which act as seals to separate the channels through which the fluids flow. The male and female portions contain a central, main channel and one or more circular channels coaxially disposed about the main channel. The by-pass ring has a main channel and may have one or more additional channels coaxially disposed about its main channel. Between each inner channel and the next adjacent outer channel, a step is formed in the male and female couplings. The outermost channel of the male coupling mates flush with the outermost channel of the female coupling, but the inner channels do not match. The by-pass ring fills the space between the openings of the inner channels of the male and female couplings. The by-pass ring has one fewer channel then the male and female channel and the O-ring seals of the by-pass channel mate against the longitudinal step surfaces formed in the male and female couplings. A separate O-ring seal mates against each step and each successive outer channel of the by-pass ring is shorter than the immediate adjacent inner one.

BRIEF DESCRIPTION OF THE DRAWINGS

FIG. 1 is longitudinal section of an exploded view of the coupling.

DETAILED DESCRIPTION OF THE INVENTION

The invention is a coupling usable wherever two or more incompatible material must be transported in the same direction and at the same time through a restricted circular opening. This invention is also applicable in situations where one of two or more material must be moved in opposite directions and must be kept separated. For the purposes of this invention, the term of material is used to describe any substance which may be moved through a pipe or tubing and includes liquids, gases, emulsions and slurries and may be applied, under certain conditions, to the movement of dry powders which can be moved pneumatically or, in the center portion, by a spiral auger. The term incompatible as used herein, refers to material which are not intended to be in contact with each other under the conditions of transport.

The coupling is intended to be used in conjunction with air conditioning systems in which volatile liquids are compressed and expanded at different points within the system and must be transported between these points along the same path. Other uses are in hot and cold water systems, hydraulic and brake systems and similar multiple component system. The most obvious use occurs in deep well drilling systems wherein combinations of fluids and gases are transported from the surface to the bottom of the well and returned to the surface together with material being extracted.

The size of the coupling is not specifically limited and the coupling may be formed in any size which is consistent with the volume of flow and the viscosity of a material which is to be transported in each channel. The coupling may be formed from any material capable of withstanding the temperatures, pressures, of operation, and corrosivity of the materials to be transported and which can be fabricated in the necessary shape. Typically, the components would be fabricated from a metal alloy such as a stainless steel or a bronze, although engineering grade plastics may be equally suitable for certain uses. The seals which fit between the components of the coupling may be formed from any compressible material which is compatible with the fluids being transported.

The components of the coupling are illustrated in FIG. 1 The specific embodiment is a coupling such as that which would be used for an air-lift type deep drilling operation in which a water and air mixture is pumped from the surface to the bottom of a well and is returned to the surface mixed with the material being extracted. The relative sizes of the components are selected and shown in FIG. 1 for such a use and the sizes may be adjusted to accommodate different ratios of volumes of materials to be transported in any channel and to accommodate differences in flow rate resulting form the density and viscosity of each individual component. A main channel 1 in the male portion of the coupling is connected to delivery pipe 0 by well known methods such as welding, which is indicated here. Disposed about the main channel 1 is a second chamber 2 and disposed around 2 is a third chamber 3. In the illustrated embodiment, these chambers do not connect to companion chambers coaxially arrayed about pipe 0 but are closed with pressed rings 21 and 22. In the embodiment illustrated air and exhaust gas are transported through chambers 2 and 3. Hose connections 2', 3' to the chambers 2, 3, respectively are sufficient to continue the path of the flowed gas. Other connections away from the coupling, as would be known to those skilled in the art are equally suitable. Channels 4 and 5 connect chambers 2 and 3 to the connecting face of the coupling. Stepped surfaces 7 correspond to bores of different diameter which provide each channel with a longitudinal and a lateral face inside the coupling. Surface 6 is the projected portion of the outside of the coupling and, in the preferred embodiment carries a positive means for locking, typically a machine thread. Various quick release device such as lever cams and snap rings may be employed as well.

The female connector has a main channel 1 which is connected to a delivery pipe 0, such as by welding at 18. Channel 1 has a diameter identical to that of 1 and is surrounded by chambers 14 and 15 which are disposed around 1 in like manner to chambers 2 and 3. Channels 12 and 13 extend from chambers 14 and 15 with center lines on radii indentical to those of the center lines of channels 4 and 5. As in the male connector, a series of bores exposes the ends of each channel and forms steps providing lateral and longitudinal faces. In the preferred embodiment channels of smaller diameter such as those illustrated as 4, 5, 12 and 13 terminate at their lateral face in a chamfered opening which enhances fluid flow. Surface 11 mates to surface 6 as described above.

Chambers 14, 15 are connected, respectively, with the hose connections 14', 15' to continue the path of flow.

When the male coupling is mated to the female coupling, only the outermost channels, 5 and 12, are immediately adjacent to the channel of like radius. A by-pass ring fits snugly between the male and female couplings in the void area. The by-pass ring has a main channel 1 of identical diameter to the main channels in the male and female rings. A second channel 8 is formed around the main body of the by-pass ring to fit between channels 4 and 13 and to be flush with the openings of channels 4 and 13. Between the end of the by-pass ring and the projection through which channel 8 is formed, a groove 9 is cut in each end to the by-pass ring to receive an O-ring 9' of a compressible, typically elastomeric material. Likewise, grooves 10 are cut outside the projection in which channel 8 is located and O-ring seals 10' are inserted therein. The O-rings seal on surfaces 7 and 16 respectively to positively seal each channel from the adjacent one.

In tests with the coupling, as described above, an air compressor with a capacity of 20 cubic meters per minute at a pressure 17 bar was connected to the coupling, and using an extremely sensitive measuring technique no areas of increased pressure could be detected inside the coupling.

In another embodiment, a bypass ring having a jet or atomizer may be used to control the density of the material being moved.

Due to the compact construction of the coupling, the outside dimensions are kept very small. In applications where the coupling is used to connect rotating pipes or shafts, profiles may be welded onto the outside of the pipes to strengthen and stabilize the entire assembly and to hold connecting hoses tightly to the pipe. Torque, push and pull stresses are easily absorbed.

This invention has been described in terms of its most preferred embodiment. Other applications within the scope of this invention would be obvious to one skilled in the art.

We claim:

1. A coupling for hoses, pipe and tubing which allows the simultaneous and independent flow of two or more materials through the coupling, comprising:
    (a) a male coupling portion comprising a main channel in the form of a cylindrical passage and sharing its longitudinal axis with that of the coupling, said main channel having a connector end adapted for permanent connection to a pipe or tube and a coupling end adapted for repetitive coupling and decoupling, at least one chamber arrayed circumferentially about said main channel at the connector end and adapted to communicate to hoses, pipes or tubing, circumferential channels parallel to said main channel and communicating with said chambers, an outer connector surface having means for securing and releasing inwardly tapered toward said coupling end, and an inner connector surface having a plurality of circumferential bores, the diameter of which decreases toward the main channel so as to provide each channel with a face perpendicular to said longitudinal axis, and to provide cylindrical surfaces, parallel to said longitudinal axis between said perpendicular faces.
    (b) a female coupling portion, having channels, chambers and circumferential bores which are a mirror images of said male portion; an outer connector surface projecting past said circumferential bores and an inner surface between said outer connector surface and said circumferential bores being tapered to receive said outer connector surface and securing and releasing means of said male coupling portion;
    (c) a by-pass ring comprising a main channel having a diameter identical to said main channels of said male and of said female coupling portions, and a plurality of channels formed in circumferential bands about said main channel, said circumferential bands being in number one less than the number of channels in said male and female coupling portions, said bands being formed to fit into said bores of said male and female portions, said by-pass ring having circumferential grooves between each band to receive a sealing O-ring, and
    (d) sealing O-rings insertable into said circumferential grooves wherein said sealing O-rings are attached to said by-pass ring, and said by-pass ring is inserted into said female coupling portion and said male coupling portion is inserted into said female coupling portion and secured.

2. The coupling according to claim 1, wherein the male and female portions are secured by a machine thread.

3. The coupling according to claim 1 wherein the channels other than the main channel are chamfered to a 30 degree angle at the coupling faces.

* * * * *

UNITED STATES PATENT AND TRADEMARK OFFICE
CERTIFICATE OF CORRECTION

PATENT NO. : 4,688,831
DATED : August 25, 1987
INVENTOR(S) : WERNER VIEHMANN ET AL It is certified that error appears in the above-identified patent and that said Letters Patent is hereby corrected as shown below:

On the cover page, below Item [19], change "VIEHMANN" to --- VIEHMANN ET AL ---.

On the cover page, Item [75], change "VIEHMANN," to --- VIEHMANN and BERND ENGERT, both of ---.

Signed and Sealed this

Fifth Day of April, 1988

Attest:

DONALD J. QUIGG

*Attesting Officer*

*Commissioner of Patents and Trademarks*